(12) United States Patent　(10) Patent No.: US 7,475,745 B1
DeRoos　(45) Date of Patent: Jan. 13, 2009

(54) HIGH MOBILITY VEHICLE

(76) Inventor: Bradley G. DeRoos, 1000 Technology Dr., Suite 1000, Fairmont, WV (US) 26554

( * ) Notice: Subject to any disclaimer, the term of this patent is extended or adjusted under 35 U.S.C. 154(b) by 364 days.

(21) Appl. No.: 11/432,191

(22) Filed: May 11, 2006

(51) Int. Cl.
    *B62D 55/02* (2006.01)
(52) U.S. Cl. .................. 180/9.34; 180/8.1; 180/8.2; 180/8.3; 180/9.28; 180/9.3
(58) Field of Classification Search .......... 180/9.34, 180/9.28, 9.3, 9.32, 8.1, 8.2, 8.3, 8.7
    See application file for complete search history.

(56) References Cited

U.S. PATENT DOCUMENTS

| | | | |
|---|---|---|---|
| 1,509,030 A * | 9/1924 | Roy .......................... | 180/6.7 |
| 3,460,691 A * | 8/1969 | Wieger et al. ............... | 414/718 |
| 4,566,551 A | 1/1986 | Feliz .......................... | 180/9.1 |
| 4,702,331 A | 10/1987 | Hagihara et al. ........... | 180/9.32 |
| 4,815,319 A | 3/1989 | Clement et al. .............. | 73/493 |
| 4,932,491 A | 6/1990 | Collins, Jr. ................. | 180/9.32 |
| 4,932,831 A | 6/1990 | White et al. ................ | 414/732 |
| 4,977,971 A | 12/1990 | Crane, III et al. ........... | 180/8.3 |
| 5,022,812 A | 6/1991 | Coughlan et al. ........... | 414/729 |
| 5,135,427 A | 8/1992 | Suto et al. .................... | 446/433 |
| 5,174,405 A | 12/1992 | Carra et al. ................. | 180/9.32 |
| 5,337,846 A | 8/1994 | Ogaki et al. ................. | 180/8.2 |
| 6,113,343 A | 9/2000 | Goldenberg et al. ........ | 414/729 |
| 6,318,483 B1 | 11/2001 | Garrett et al. ............... | 180/9.21 |
| 6,662,889 B2 | 12/2003 | De Fazio et al. .............. | 180/22 |
| 6,668,951 B2 * | 12/2003 | Won .......................... | 180/9.1 |
| 7,316,405 B2 * | 1/2008 | Kritman et al. ............ | 280/5.22 |
| 7,384,046 B2 * | 6/2008 | Le Masne De Chermont .... | 280/5.2 |
| 2006/0124366 A1 * | 6/2006 | Le Masne De Chermont .... | 180/9.3 |

* cited by examiner

*Primary Examiner*—Paul N Dickson
*Assistant Examiner*—Michael R Stabley
(74) *Attorney, Agent, or Firm*—Steptoe & Johnson PLLC

(57) ABSTRACT

An embodiment of a high-mobility vehicle comprises a vehicle body, a track assembly attached to the vehicle body, arms pivotally attached to the vehicle body, and trackless drive wheels mounted on distal ends of the arms. Another embodiment of a high-mobility vehicle comprises a vehicle chassis, right and left drive motors attached to the vehicle chassis, right and left power transmission mechanisms having high torque and low torque sets of gears, track assemblies coupled to the high torque sets of gears, and trackless drive wheels coupled to the low torque sets of gears.

3 Claims, 5 Drawing Sheets

HIGH MOBILITY VEHICLE

BACKGROUND

1. Field of the Invention

The present invention relates to a high-mobility vehicle which can effectively traverse and maneuver within a wide range of naturally occurring and man-made operating environments. When operated as a remotely controlled system, the high-mobility vehicle can help to ensure the safety of an operator in hazardous environments such as bomb disposal, disaster relief, and response to chemical, biological, radiological, or nuclear events.

2. Description of Related Art

There are many working and operating environments that require a vehicle with a high degree of mobility in order to accomplish specific operational objectives. Some operating scenarios are hazardous to humans which may necessitate the use of a high-mobility remotely controlled vehicle. Examples where a high-mobility remotely controlled vehicle would be advantageous include bomb disposal, mine clearance and neutralization, surveillance, environmental remediation, work in and around nuclear power plants, disaster relief, and response to terrorist events such as the release of chemical, biological, or radiological material.

SUMMARY

Manned and remotely controlled vehicles must often be able to provide a high degree of mobility in a wide range of operating environments. A high-mobility vehicle is described which offers enhanced maneuverability and control while operating in diverse environments including, but not limited to: gravel and finished road surfaces; rugged, off-road operating areas; and, urban environments, both inside and outside of buildings. The high-mobility vehicle described herein includes two forward end and two rearward end arm and wheel assemblies and two track assemblies. The arm and wheel assemblies have wheels mounted at the outer end of each arm, and have inner ends which are pivotally mounted on the vehicle chassis. The forward and rearward arm and wheel assemblies can be downwardly deployed, thereby raising the vehicle track assemblies off of the driving surface, thereby allowing the vehicle to maneuver without utilizing the track assemblies. Pivoting the arm and wheel assemblies downward to lift the chassis and track assemblies would most often be performed in those situations where the traction provided by the wheel assemblies is sufficient for vehicle locomotion. Additionally, the arm and wheel assemblies can be pivoted upward to a position past vertical. This results in vehicle footprint reduction which serves to enhance maneuverability in constrained operating environments. The high-mobility vehicle described is equipped with a power transmission mechanism that provides high and low gear ratios. The power transmission mechanism creates a high-torque, low-speed mode of operation when the vehicle is using the track assemblies for locomotion and steering, and a low-torque, high-speed mode of operation when the vehicle is using the wheel assemblies for locomotion and steering.

One or two movable pairs of arm and wheel assemblies are provided on a high-mobility vehicle that can alternately be driven by wheels located at the end of arm and wheel assemblies, or by track assemblies. The arm and wheel assemblies pivot about points at the rearward and forward ends of the vehicle chassis, thereby allowing the operator to downwardly rotate the arm and wheel assemblies to lift the track assemblies off of the ground, or upwardly rotate the arm and wheel assemblies to establish a reduced vehicle footprint.

The arms preferably can be pivoted downward by at least five degrees to lift the track assemblies. The primary arms preferably can be pivoted upward by at least ninety degrees to achieve a vehicle configuration with a reduced footprint.

The integral power transmission mechanisms allow the vehicle to operate in a high-torque, low-speed mode of operation or alternatively, a low-torque, high-speed mode of operation. In the high-speed, low-torque mode of operation, the drive wheels provide locomotive force; in the low-speed, high-torque mode of operation, the track assemblies provide locomotive force.

Utilizing wheels as a means of locomotion reduces rolling losses as compared to the rolling losses associated with tracked vehicles. Reduction of rolling losses extends the operating life of a platform that relies on a self-contained power source as the basis for locomotion. There are advantages to being able to alter or reconfigure locomotive means on a given platform between wheeled locomotion and tracked locomotion. Mobility, maneuverability, speed and mechanical efficiency are all affected by the locomotive means selected. The combination of tracks and wheels can provide a vehicle in which vibrations are decreased when running, which has greater stability in rough terrain and on stairs, and which has increased vehicle speed compared to a track-only design.

Accordingly, it is an object of the present invention to provide a vehicle that has high-mobility in a wide range of operating environments, which has a footprint that can be modified to allow operation in space-constrained environments, and which provides the ability to effectively and efficiently transition from a high-speed, low-torque mode of operation to a low-speed, high-torque mode of operation.

DETAILED DESCRIPTION

Figure 1:
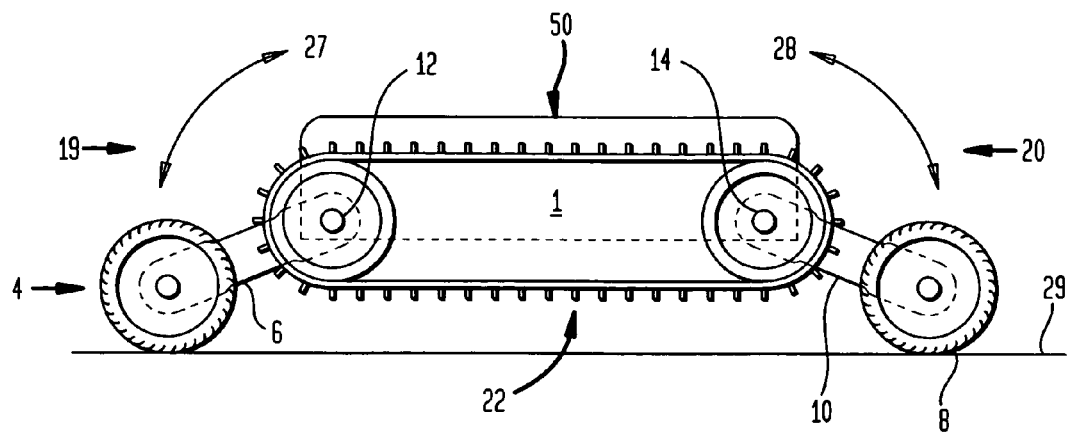
FIG. 1 is a side elevation view of an embodiment of a high-mobility vehicle.
Figure 2:
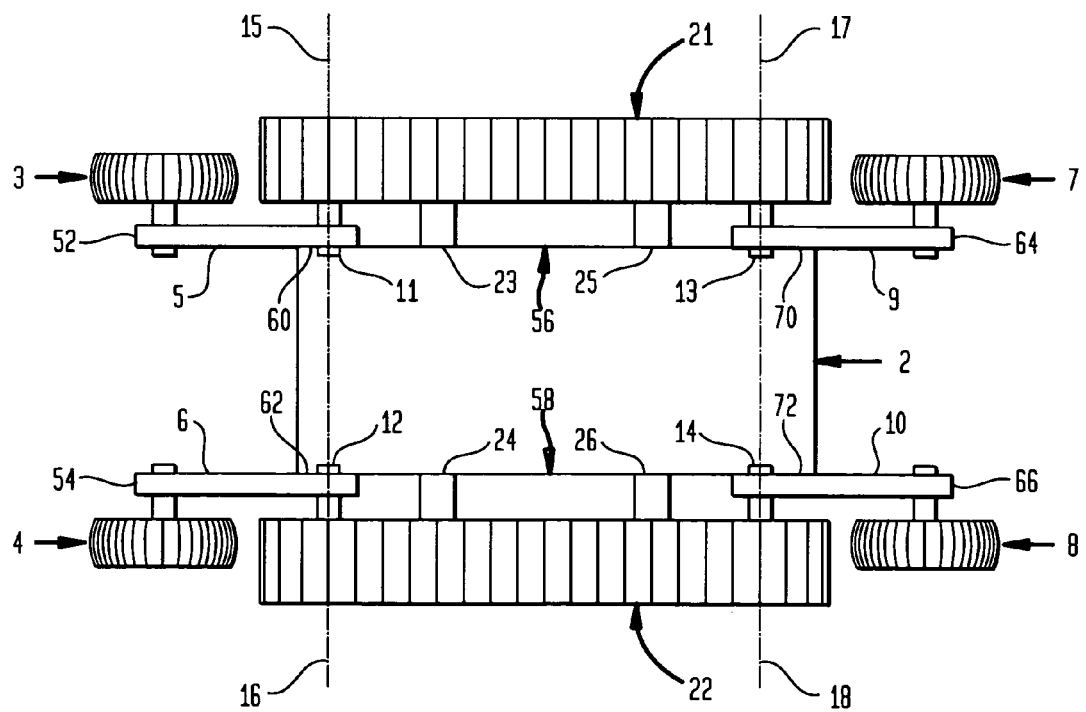
FIG. 2 is a plan view of the vehicle of FIG. 1.
Figure 3:
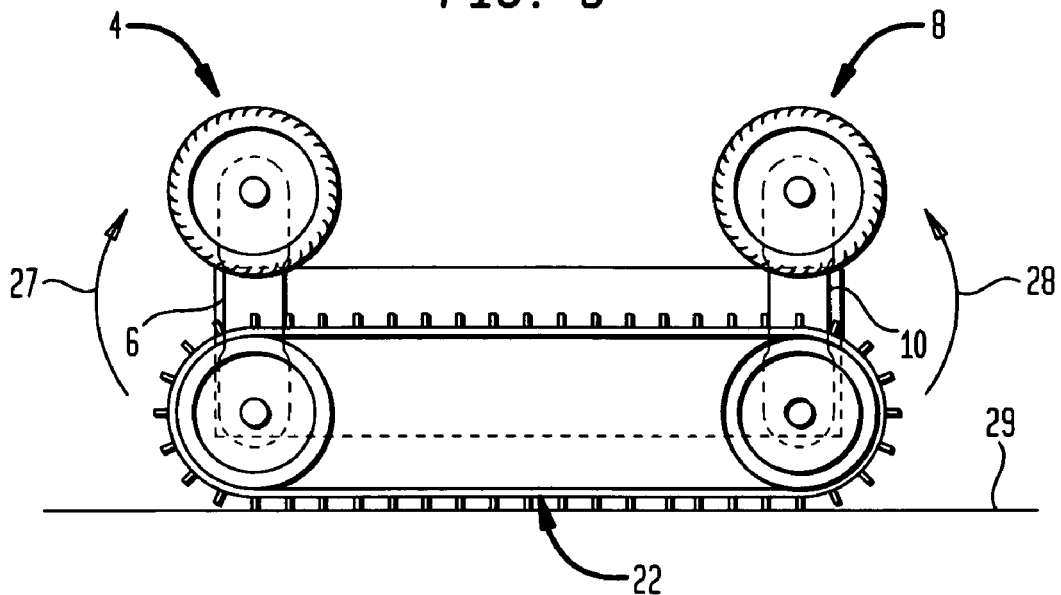
FIG. 3 is a side elevation view of the vehicle of FIG. 1 showing the arms pivoted upward.

FIGS. 1-3 illustrate a high-mobility vehicle 1 which includes a vehicle body 50 comprising a chassis 2. The vehicle body 50 has a front portion 19, a rear portion 20, a right side 56, and a left side 58. Front trackless drive wheels 3, 4 are mounted at the distal ends 52, 54 of front arms 5, 6. The proximal ends 60, 62 of the front arms 5, 6 are pivotally mounted on the chassis 2 with pivot mounts 11, 12. Similarly, rear trackless drive wheels 7, 8 are mounted at the distal end 64, 66 of rear arms 9, 10. The proximal ends 70, 72 of the rear arms 9, 10 are pivotally mounted on the chassis 2 with pivot mounts 13, 14. The front arm and trackless drive wheel assemblies rotate about axis 15-16, and the rear arm and trackless drive wheel assemblies rotate about axis 17-18. The front and rear arms 5, 6, 9, 10 are configured such that the trackless drive wheels 3, 4, 7, 8 can pivotally rotate 27, 28 while remaining clear of right and left track assemblies 21, 22. The track assemblies 21, 22 are mounted on the chassis 2 with track chassis mounts 23-26. Steer wheels or caster wheels may optionally be mounted on the front arms 5, 6 in lieu of trackless drive wheels 3, 4.

Rotation of the front and rear arm and trackless drive wheel assemblies allows the vehicle 1 to be configured such that the trackless drive wheels 3, 4, 7, 8 are placed in contact with the drive surface 29 as shown in FIG. 1, or conversely, configured such that the track assemblies 21, 22 are placed in contact with the drive surface 29 as shown in FIG. 3.

The front and rear arms 5, 6, 9, 10 can be pivoted by a variety of mechanisms or actuators including hydraulic motors, electric motors, and linear electric or linear hydraulic actuators. The trackless drive wheels 3, 4, 7, 8 and track assemblies 21, 22 can also be driven by a variety of drive mechanisms including hydraulic motors or electric motors. The front arms 5, 6 and the rear arms 9, 10 may pivot independently of one another. Alternatively, the front arms 5, 6 and the rear arms 9, 10, may be rigidly connected. The actuators should generate sufficient torque to rotate the arms 5, 6, 9, 10 downward toward the driving surface 29 such that the trackless drive wheels 3, 4, 7, 8 can contact the driving surface 29 and raise the track assemblies 21, 22 off the driving surface 29. The actuators can rotate the arms 5, 6, 9, 10 to defined positions. For example, the arms 5, 6, 9, 10 can be pivoted downward below horizontal by at least five degrees to lift the track assemblies 21, 22. The arms 5, 6, 9, 10 can also be pivoted upward above horizontal by at least ninety degrees to achieve a vehicle configuration with a reduced footprint.

Figure 4:
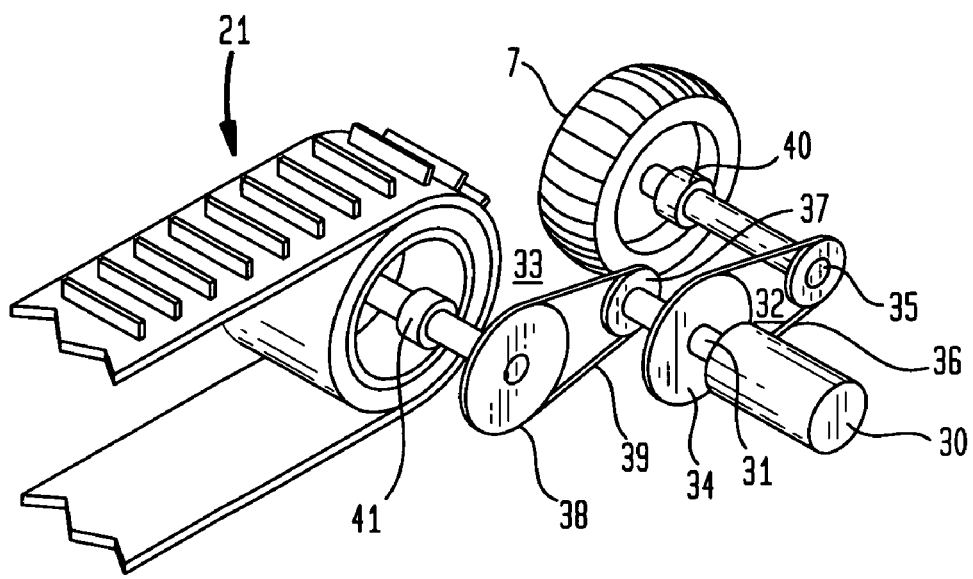
FIG. 4 is a perspective partial view of an embodiment of a high-mobility vehicle power transmission mechanism.
Figure 5:
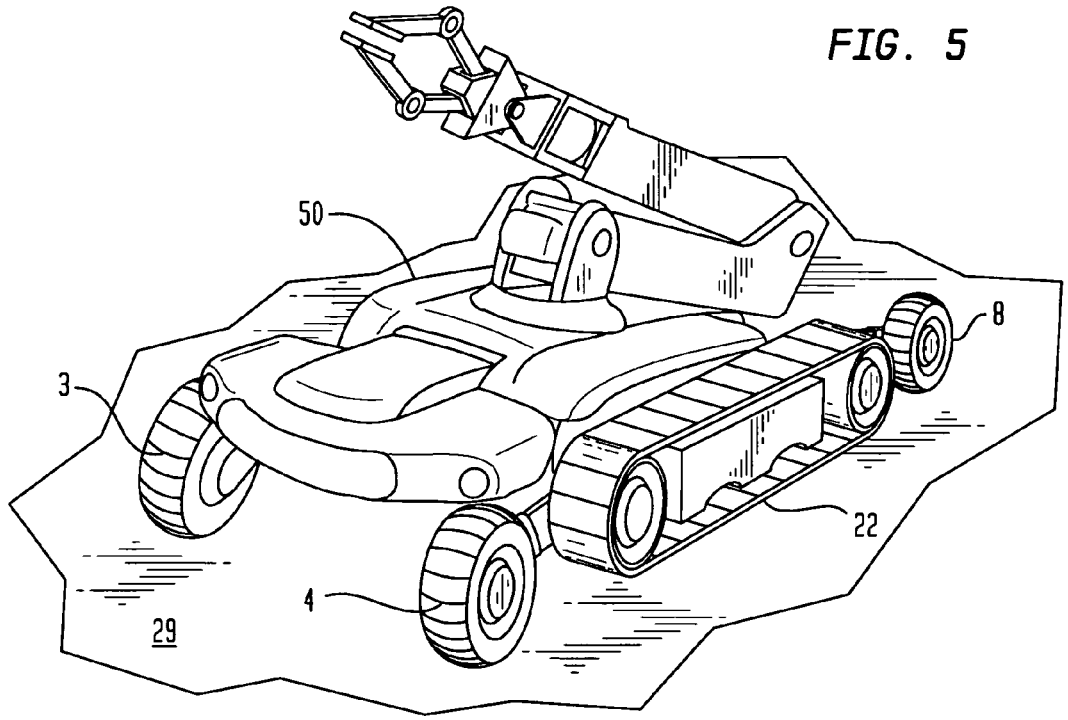
FIG. 5 is a perspective view of an embodiment of a high-mobility vehicle.
Figure 6:
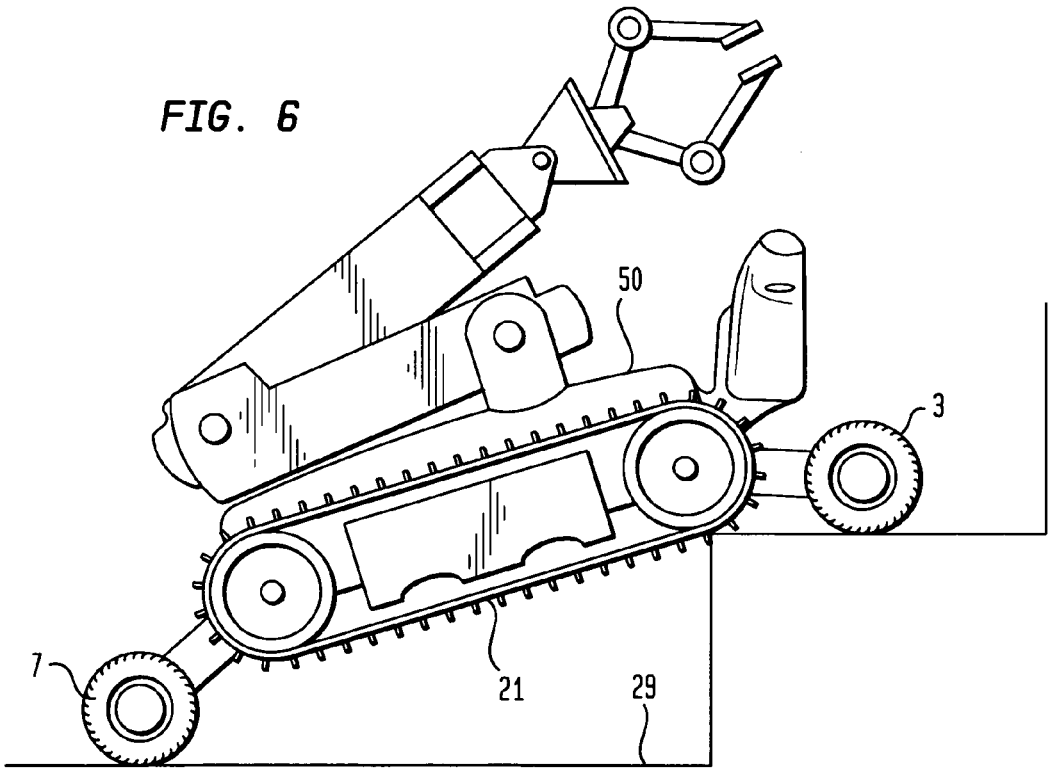
FIG. 6 is a side elevation view of the vehicle of FIG. 5 traversing steps.
Figure 7:
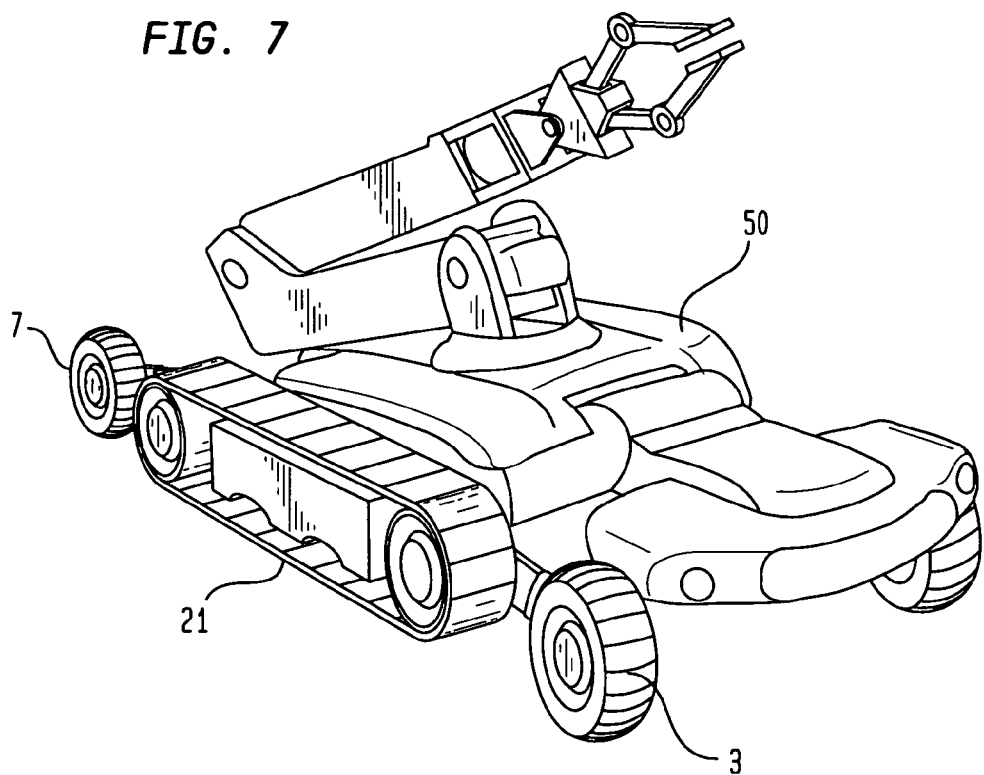
FIG. 7 is a perspective view of an embodiment of a high-mobility vehicle.
Figure 8:
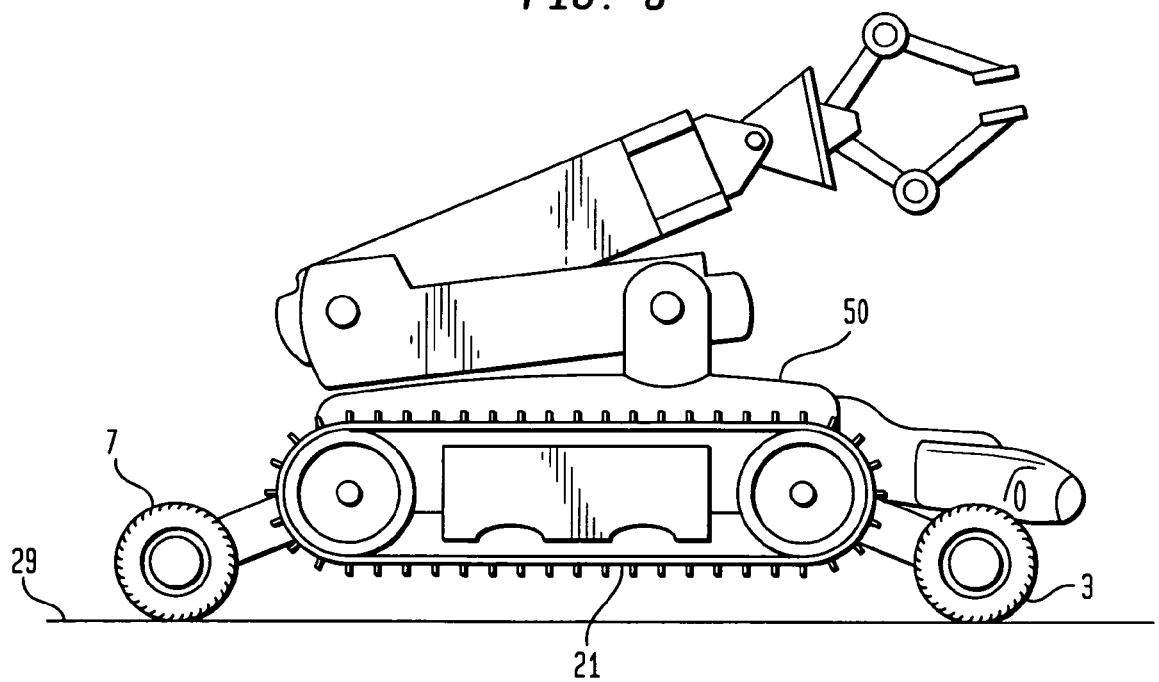
FIG. 8 is a side elevation view of an embodiment of a high-mobility vehicle.
Figure 9:
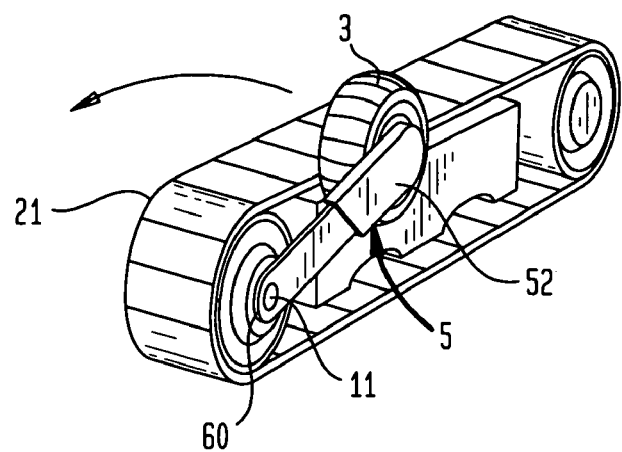
FIG. 9 is a perspective view of an embodiment of an arm and trackless drive wheel.
Figure 10:
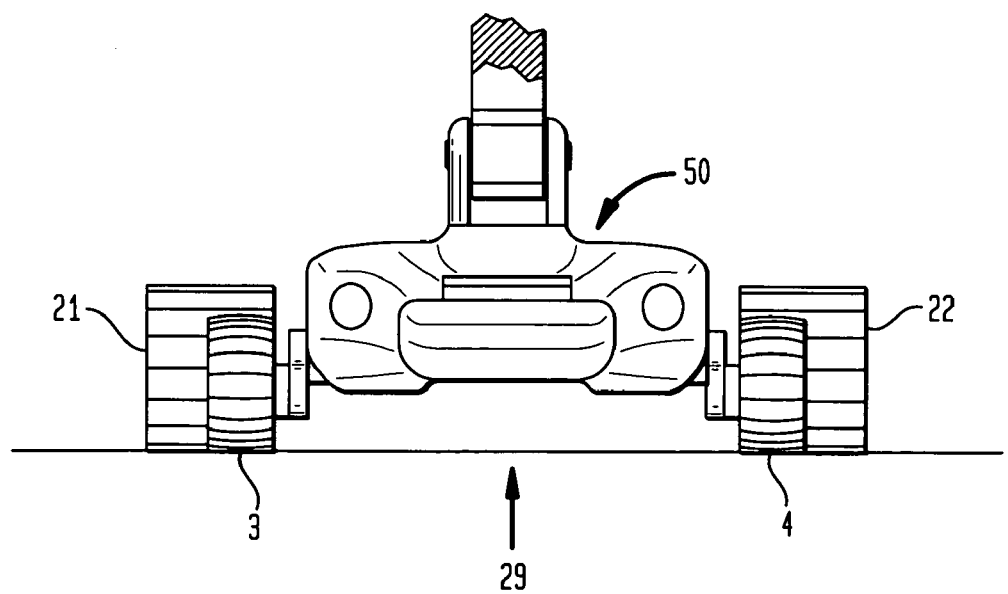
FIG. 10 is a front elevation view of an embodiment of a high-mobility vehicle.

FIG. 4 illustrates a two-speed power transmission mechanism that allows the high-mobility vehicle 1 to be driven in a high-speed, low-torque mode of operation or, conversely, in a low-speed, high-torque mode of operation. In this figure, a drive motor 30 acts to rotate a drive motor shaft 31. The drive motor shaft is rigidly connected to a first and second set of reduction gears 32, 33. The first set of reduction gears 32 is comprised of a primary gear sprocket 34 that acts to drive a secondary gear sprocket 35 via a drive chain 36. The second set of reduction gears 33 is comprised of a primary gear sprocket 37 that acts to drive a secondary gear sprocket 38 via a drive chain 39. Alternatively, the drive motor 30 can include an integrated gear box that combines the drive motor 30 and a first set of reduction gears 32 in an integrated drive motor 30/gear box package. A second set of reduction gears 33 can be connected to an output shaft. While sprocket and chains are depicted in this embodiment, other power transfer mechanisms such as belt drives or direct gear coupling can be utilized.

The embodiment of the two-speed power transmission mechanism shown allows the trackless drive wheel 7 to rotate at a speed that is higher than the rotation speed of the drive motor shaft 31, and the track assembly 21 to rotate at a speed that is lower than the rotation speed of the drive motor shaft 31. Given the torque and speed characteristics of the selected drive motor 30, this configuration allows the trackless drive wheel 7 to operate in a high-speed, low-torque mode of operation. Conversely, the configuration shown also allows the track assembly 21 to operate in a low-speed, high-torque mode of operation. Those skilled in the art recognize that there are numerous ways in which the two-speed power transmission system could be configured to serve specific operational needs. Trackless drive wheel 8 and track assembly 22 may be powered using a separate but comparable power transmission mechanism, and using a separate but comparable drive motor or the same drive motor 30. The other trackless drive wheels 3, 4 may be powered similarly.

FIG. 4. also illustrates a wheel disconnect or decoupler 40 and a track assembly disconnect or decoupler 41 that allow the power transmission mechanism to be decoupled from the trackless drive wheel 7 or track assembly 21 if desired. Likewise, similar decouplers may be used for the other trackless drive wheels 3, 4, 8 and the other track assembly 22. Alternatively a slip clutch could be used, which would allow the wheels to turn at the same speed as the tracks if both are in contact with the ground simultaneously. Such a configuration will allow the tracks and wheels to provide locomotive force concurrently if there is no rotation of the arms and wheels above or below the horizontal axis. A preferred embodiment is an electrically activated clutch, but those skilled in the art will recognize that a number of methods could be implemented to provide decoupling and are considered to be within the scope of the invention.

The two-speed power transmission configuration, coupled with the ability to selectively place the wheels 3, 4, 7, 8 or track assemblies 21, 22 in contact with the drive surface 29 creates a high-mobility vehicle 1 that can quickly and seamlessly transition to operate effectively in a wide variety of natural and man-made operating environments. The benefits derived from using track assemblies, along with the benefits derived from using a wheeled platform are both realized in the embodiments set forth.

FIGS. 5-10 depict various perspective and elevation views of embodiments of the high-mobility vehicle 1.

What is claimed is:

1. A high-mobility vehicle comprising:
   a vehicle chassis;
   a right drive motor attached to the vehicle chassis;
   a left drive motor attached to the vehicle chassis;
   a right power transmission mechanism, wherein the right power transmission mechanism comprises a right drive motor shaft coupled to the right drive motor, a right high torque set of gears coupled to the right drive motor shaft, and a right low torque set of gears coupled to the right drive motor shaft;
   a left power transmission mechanism, wherein the left power transmission mechanism comprises a left drive motor shaft coupled to the left drive motor, a left high torque set of gears coupled to the left drive motor shaft, and a left low torque set of gears coupled to the left drive motor shaft;
   a right track assembly coupled to the right high torque set of gears;
   a left track assembly coupled to the left high torque set of gears;
   a right trackless drive wheel coupled to the right low torque set of gears; and
   a left trackless drive wheel coupled to the left low torque set of gears.

2. The high-mobility vehicle of claim 1, further comprising a decoupler for selectively decoupling the right track assembly, the left track assembly, the right trackless drive wheel, or the left trackless drive wheel.

3. The high-mobility vehicle of claim 2, wherein the decoupler is a slip clutch.

* * * * *